United States Patent
Kuo et al.

(10) Patent No.: US 12,207,005 B2
(45) Date of Patent: Jan. 21, 2025

(54) COLOR FILTER ARRAY AND DEMOSAICING METHOD

(71) Applicant: VisEra Technologies Company Ltd., Hsin-Chu (TW)

(72) Inventors: An-Li Kuo, Hsin-Chu (TW); Han-Lin Wu, Hsin-Chu (TW)

(73) Assignee: VisEra Technologies Company Ltd., Hsin-Chu (TW)

( * ) Notice: Subject to any disclaimer, the term of this patent is extended or adjusted under 35 U.S.C. 154(b) by 146 days.

(21) Appl. No.: 17/985,557

(22) Filed: Nov. 11, 2022

(65) Prior Publication Data
US 2024/0163573 A1    May 16, 2024

(51) Int. Cl.
*H04N 25/13* (2023.01)
*G06T 3/4015* (2024.01)
*H04N 25/133* (2023.01)

(52) U.S. Cl.
CPC ......... *H04N 25/134* (2023.01); *G06T 3/4015* (2013.01); *H04N 25/133* (2023.01)

(58) Field of Classification Search
CPC ... H04N 25/133; H04N 25/134; G06T 3/4015
See application file for complete search history.

(56) References Cited

U.S. PATENT DOCUMENTS

2015/0085089 A1* 3/2015 Shigemura .......... H04N 13/351
348/54

FOREIGN PATENT DOCUMENTS

| JP | 2007184904 A | 7/2007 |
|----|--------------|--------|
| JP | 2019092145 A | 6/2019 |
| JP | 2022158989 A | 10/2022 |
| WO | 2017094362 A | 6/2017 |

* cited by examiner

*Primary Examiner* — Yogesh K Aggarwal
(74) *Attorney, Agent, or Firm* — LIU & LIU

(57) ABSTRACT

The present disclosure provides a color filter array. The color filter array includes at least one minimal repeating unit, wherein the at least one minimal repeating unit includes a first filter set and a second filter set. The first filter set includes a first color filter having a first spectrum, two second color filters having a second spectrum and a third color filter having a third spectrum. The second filter set includes a fourth color filter having the first spectrum, two fifth color filters having the second spectrum, a sixth color filter having the third spectrum and a plurality of broadband filters. The second filter set is arranged to form a quadrilateral annulus, and the first filter set is positioned in an interior of the quadrilateral annulus. The present disclosure also provides a demosaicing method for an image captured via the color filter array.

20 Claims, 9 Drawing Sheets

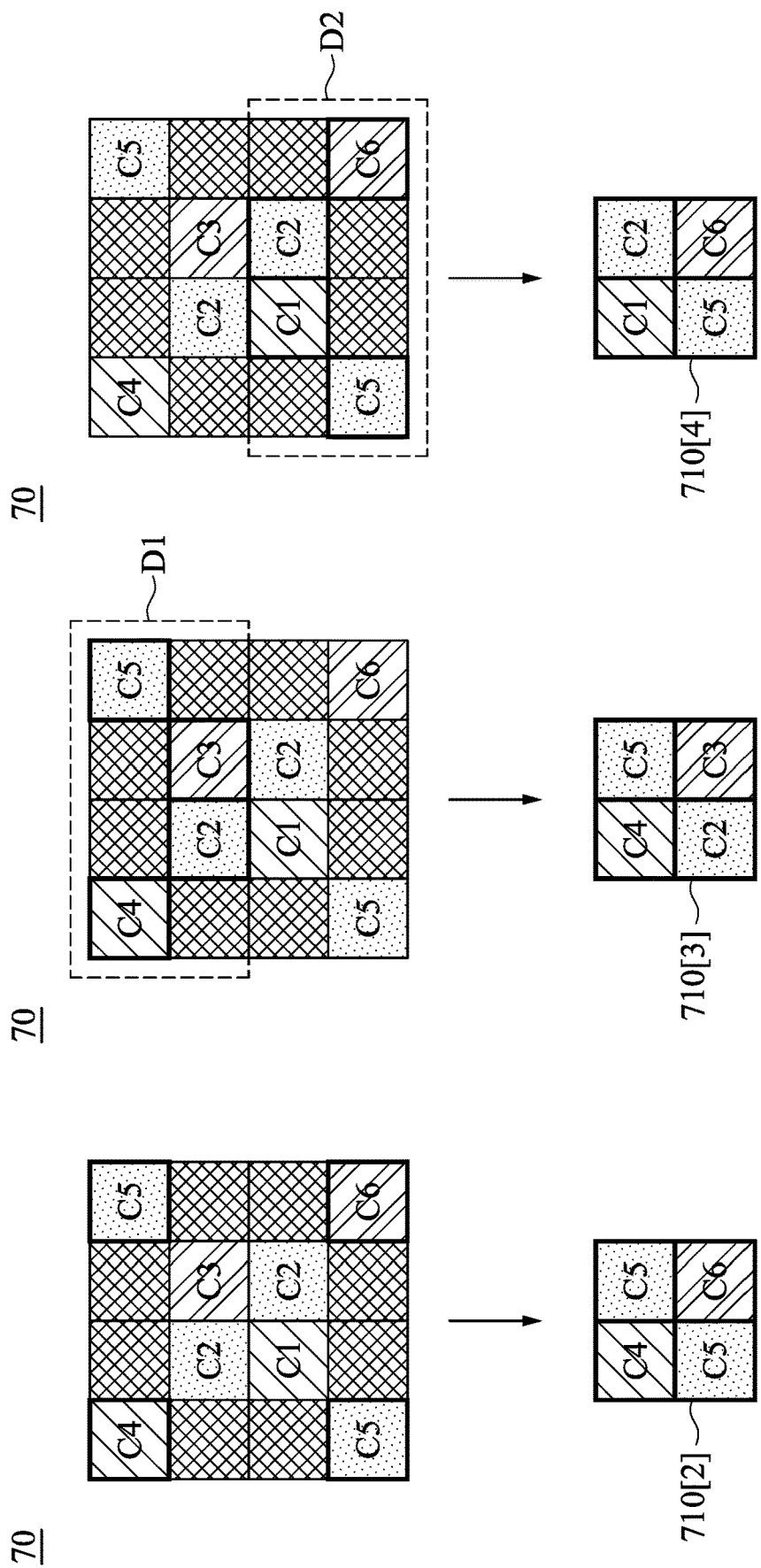

COLOR FILTER ARRAY AND DEMOSAICING METHOD

BACKGROUND

Field of Invention

This disclosure relates to a color filter array and demosaicing method, and in particular to a color filter array and demosaicing method for an image sensor.

Description of Related Art

The digital cameras today often use the image sensor covered with a color filter array (CFA) and perform a demosaicing method on the mosaiced image captured via the CFA to acquire the quality image. For this reason, it is essential to improve the CFA and/or the demosaicing method.

SUMMARY

An aspect of present disclosure relates to a color filter array. The color filter array includes at least one minimal repeating unit, wherein the at least one minimal repeating unit includes a first filter set and a second filter set. The first filter set includes a first color filter having a first spectrum, two second color filters having a second spectrum and a third color filter having a third spectrum. The second filter set includes a fourth color filter having the first spectrum, two fifth color filters having the second spectrum, a sixth color filter having the third spectrum and a plurality of broadband filters. The second filter set is arranged to form a quadrilateral annulus, and the first filter set is positioned in an interior of the quadrilateral annulus.

Another aspect of present disclosure relates to a demosaicing method for an image captured via a color filter array, wherein the image includes at least one color filter array (CFA) pattern. The demosaicing method includes: using a plurality of color pixels of the at least one CFA pattern to generate a plurality of first resolution color images and a plurality of second resolution color images, wherein a resolution of each of the second resolution color images is same as a resolution of the at least one CFA pattern and is higher than a resolution of each of the first resolution color images; performing a weighted average calculation on the first resolution color images and the second resolution color images to generate a plurality of averaged color images; and fusing a panchromatic image with the averaged color images to generate a plurality of demosaiced color images, wherein a resolution of the panchromatic image and a resolution of each of the averaged color images are same as the resolution of the at least one CFA pattern.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows:

FIGS. 9A-9C are schematic diagrams of a subsampling process for color pixels of the CFA pattern in accordance with some embodiments of the present disclosure.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
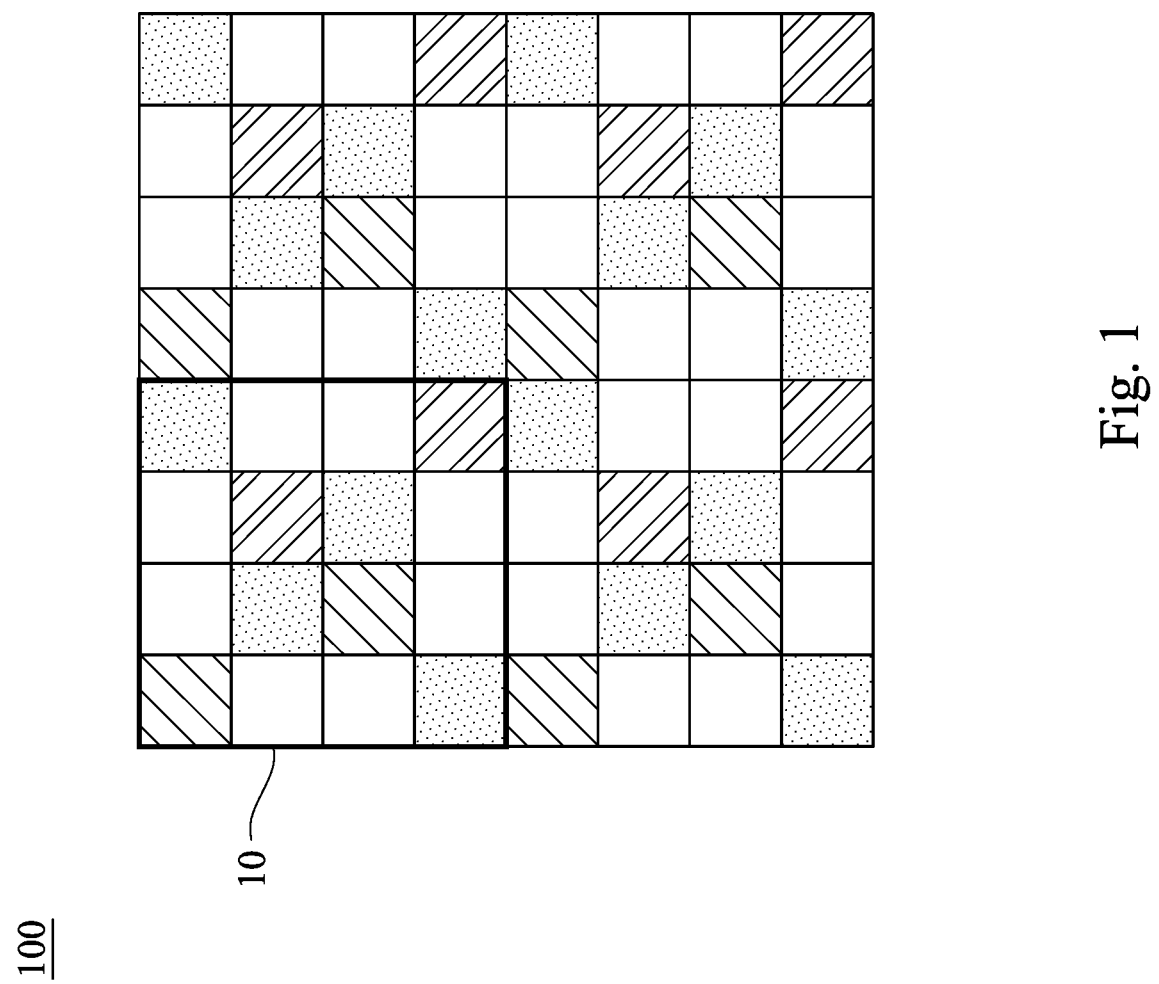
FIG. 1 is a schematic diagram of a color filter array in accordance with some embodiments of the present disclosure.

Referring to FIG. 1, FIG. 1 is a schematic diagram of a color filter array 100 in accordance with some embodiments of the present disclosure. In some embodiments, the color filter array 100 is applied to an image sensor (not shown). For example, the color filter array 100 can be repeatedly arranged in the image sensor, so that the image sensor is able to capture a mosaicked image (not shown) via the color filter array 100. As shown in FIG. 1, the color filter array 100 includes at least one minimal repeating unit 10.

Figure 2:
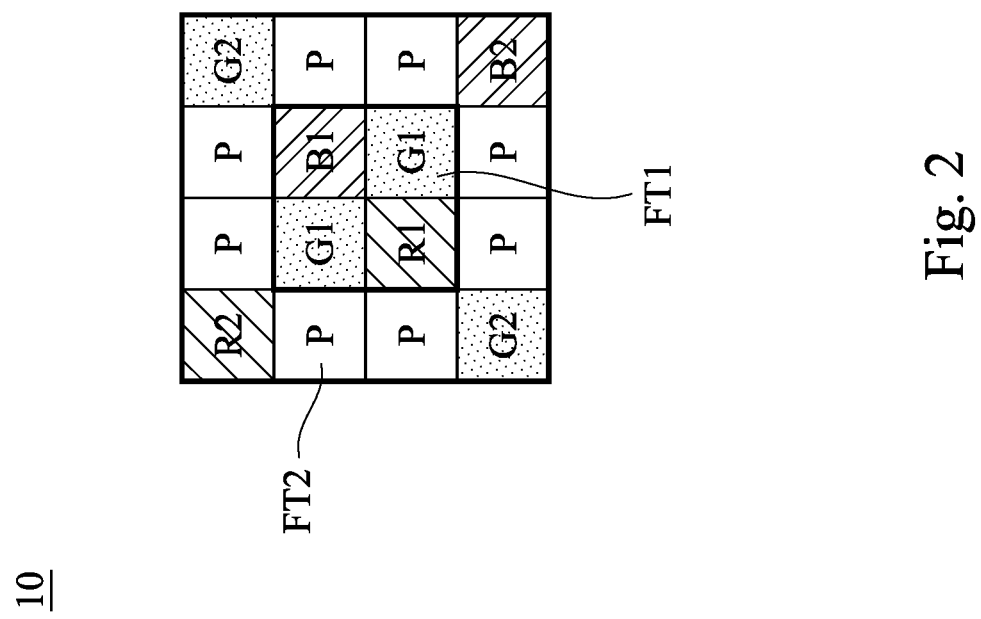
FIG. 2 is a schematic diagram of a minimal repeating unit of the color filter array in accordance with some embodiments of the present disclosure.

Referring to FIG. 2, FIG. 2 is a schematic diagram of the minimal repeating unit 10 of the color filter array 100 in accordance with some embodiments of the present disclosure. In some embodiments, the minimal repeating unit 10 includes a first filter set FT1 and a second filter set FT2.

As shown in FIG. 2, the first filter set FT1 includes a first color filter R1 having a first spectrum, two second color filters G1 having a second spectrum and a third color filter B1 having a third spectrum. The second filter set FT2 includes a fourth color filter R2 having the first spectrum, two fifth color filters G2 having the second spectrum, a sixth color filter B2 having the third spectrum and a plurality of broadband filters P. In particular, the first color filter R1 and the fourth color filter R2 each is configured to allow red light corresponding to the first spectrum to pass through, the second color filter G1 and the fifth color filters G2 each is configured to allow green light corresponding to the second spectrum to pass through, and the third color filter B1 and the sixth color filter B2 each is configured to allow blue light corresponding to the third spectrum to pass through. In addition, the broadband filter P is configured to allow white light (which include at least red, green and blue light) to pass through. In other words, the broadband filter P has a spectrum broader than any of the first spectrum, the second spectrum and the third spectrum.

It can be seen from descriptions of FIG. 2 that the proportion of a red light channel of the minimal repeating unit 10 is 12.5%, the proportion of a green light channel of the minimal repeating unit 10 is 25%, the proportion of a blue light channel of the minimal repeating unit 10 is 12.5%, and the proportion of a broadband light channel of the minimal repeating unit 10 is 50%.

In some embodiments, as shown in FIG. 2, the first color filter R1, the two second color filters G1 and the third color filter B1 are arranged in array of 2 rows by 2 columns, so as to form a Bayer arrangement which is square. Furthermore, the second filter set FT2 is arranged to form a quadrilateral annulus, so as to surround the first filter set FT1. That is, the first filter set FT1 is positioned in an interior of the quadrilateral annulus. It can be seen from above descriptions that at least one array of 2 rows by 2 columns in the minimal repeating unit 10 is arranged without the broadband filter P.

Figure 3C:
FIGS. 3A-3C are schematic diagrams of the minimal repeating unit and the rearranged array of part of color filters in the minimal repeating unit in accordance with some embodiments of the present disclosure.
Figure 3B:
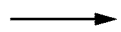
Figure 3A:

Referring to FIGS. 3A-3C, FIGS. 3A-3C are schematic diagrams of rearranging the part of the color filters in the minimal repeating unit 10 in accordance with some embodiments of the present disclosure. It can be appreciated that the part of the color filters in the minimal repeating unit 10 is not really rearranged in array of 2 rows by 2 columns, and the embodiments of FIGS. 3A-3C are illustrated for describing the relative position relationship of the part of the color filters in the minimal repeating unit 10.

As shown in FIG. 3A, when the fourth color filter R2, the two fifth color filters G2 and the sixth color filter B2 of the second filter set FT2 are taken out of the minimal repeating unit 10 and are rearranged in array of 2 rows by 2 columns without changing its relative position relationship in the minimal repeating unit 10, the fourth color filter R2, the two fifth color filters G2 and the sixth color filter B2 of the second filter set FT2 rearranged in array of 2 rows by 2 columns forms the Bayer arrangement. It can be seen from FIG. 3A that, either in the minimal repeating unit 10 or in rearranged array of 2 rows by 2 columns, the fourth color filter R2 is to the left of the fifth color filter G2 at the upper right corner and is above the fifth color filter G2 at the lower left corner, and the sixth color filter B2 is below the fifth color filter G2 at the upper right corner and is to the right of the fifth color filter G2 at the lower left corner.

As shown in FIG. 3B, when the fourth color filter R2, the fifth color filter G2, the second color filter G1 and the third color filter B1 in an upper region A1 of the minimal repeating unit 10 are taken out of the minimal repeating unit 10 and are rearranged in array of 2 rows by 2 columns without changing its relative position relationship in the minimal repeating unit 10, rearranged array of 2 rows by 2 columns forms the Bayer arrangement. It can be seen from FIG. 3B that, either in the minimal repeating unit 10 or in rearranged array of 2 rows by 2 columns, the fourth color filter R2 is to the left of the fifth color filter G2 and is above the second color filter G1, and the third color filter B1 is below the fifth color filter G2 and is to the right of the second color filter G1.

As shown in FIG. 3C, when the first color filter R1, the fifth color filter G2, the second color filter G1 and the sixth color filter B2 in a lower region A2 of the minimal repeating unit 10 are took out of the minimal repeating unit 10 and are rearranged in array of 2 rows by 2 columns without changing its relative position relationship in the minimal repeating unit 10, rearranged array of 2 rows by 2 columns forms the Bayer arrangement. It can be seen from FIG. 3C that, either in the minimal repeating unit 10 or in rearranged array of 2 rows by 2 columns, the first color filter R1 is to the left of the second color filter G1 and is above the fifth color filter G2, and the sixth color filter B2 is below the second color filter G1 and is to the right of the fifth color filter G2.

It can be seen from FIGS. 3A-3B that when part of the color filters is taken out of the minimal repeating unit 10 and is rearranged in array of 2 rows by 2 columns without changing its relative position relationship in the minimal repeating unit 10, the part of the color filters rearranged in array of 2 rows by 2 columns forms the Bayer arrangement.

Figure 4B:
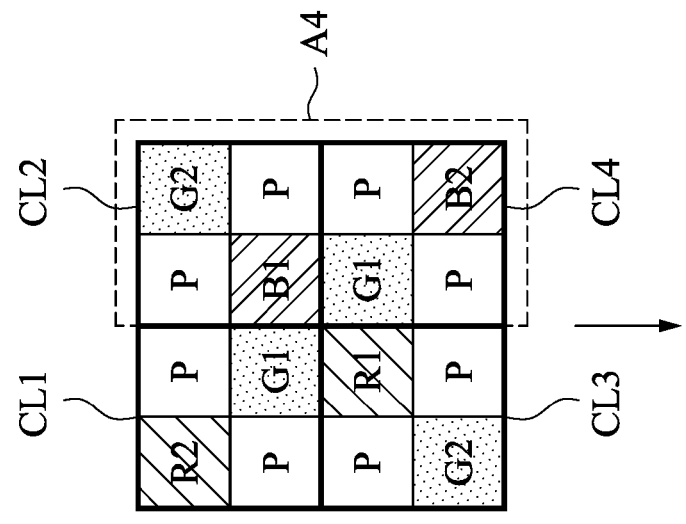
FIGS. 4A-4B are schematic diagrams of a plurality of cells in the minimal repeating unit in accordance with some embodiments of the present disclosure.
Figure 4B:
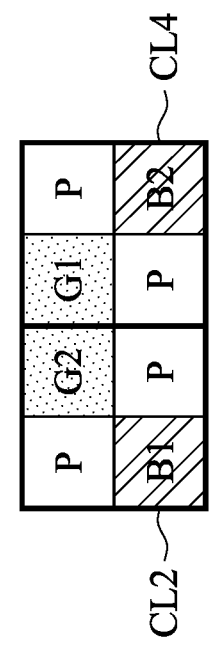
Figure 4A:
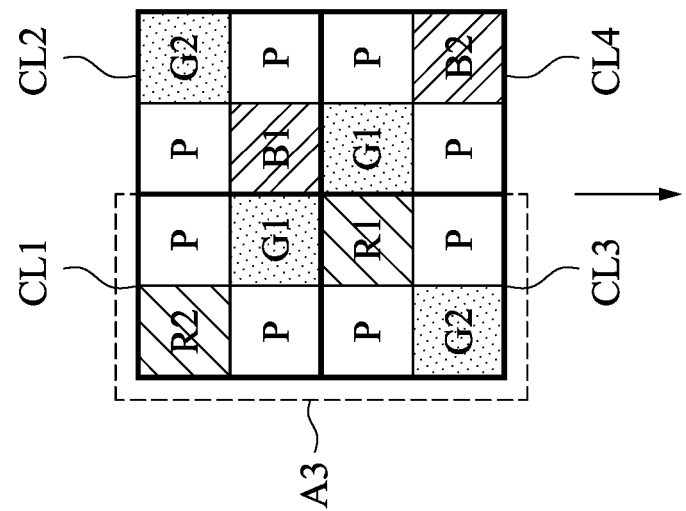
Figure 4A:
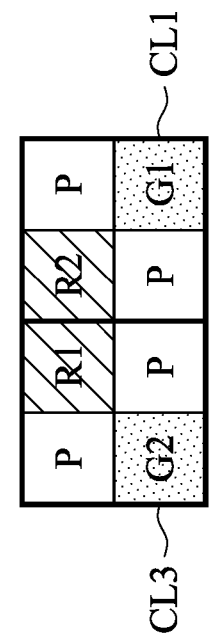

Referring to FIGS. 4A-4B, FIGS. 4A-4B are schematic diagrams of a plurality of cells in the minimal repeating unit 10 in accordance with some embodiments of the present disclosure. In some embodiments, as shown in FIGS. 4A-4B, the minimal repeating unit 10 is divided into four cells CL1-CL4, and the four cells CL1-CL4 are arranged in a square array. It can be seen from FIGS. 4A and 4B that each of the cell CL1-CL4 includes two broadband filters P and two different color filters.

In some embodiments, the cell CL1 and the cell CL3 in a left side region A3 (as shown in FIG. 4A) of the minimal repeating unit 10 are symmetrical to each other when being rearranged along a horizontal direction. For example, when the cell CL1 are moved towards the lower right of the minimal repeating unit 10 until the left border of the cell CL1 is adjacent to the right border of the cell CL3, the cell CL1 and the cell CL3 are symmetrical to each other.

In some embodiments, the cell CL2 and the cell CL4 in a right side region A4 (as shown in FIG. 4B) of the minimal repeating unit 10 are symmetrical to each other when being rearranged along a horizontal direction. For example, when the cell CL2 are moved towards the lower left of the minimal repeating unit 10 until the right border of the cell CL2 is adjacent to the left border of the cell CL4, the cell CL2 and the cell CL4 are symmetrical to each other.

In the above embodiments of FIGS. 4A and 4B, the cells CL1 and CL3 in the minimal repeating unit 10 are not really rearranged, and the cells CL2 and CL4 in the minimal repeating unit 10 are not really rearranged. The embodiments of FIGS. 4A and 4B are only illustrated for describing the cells CL1-CL4 in the minimal repeating unit 10.

Figure 5:
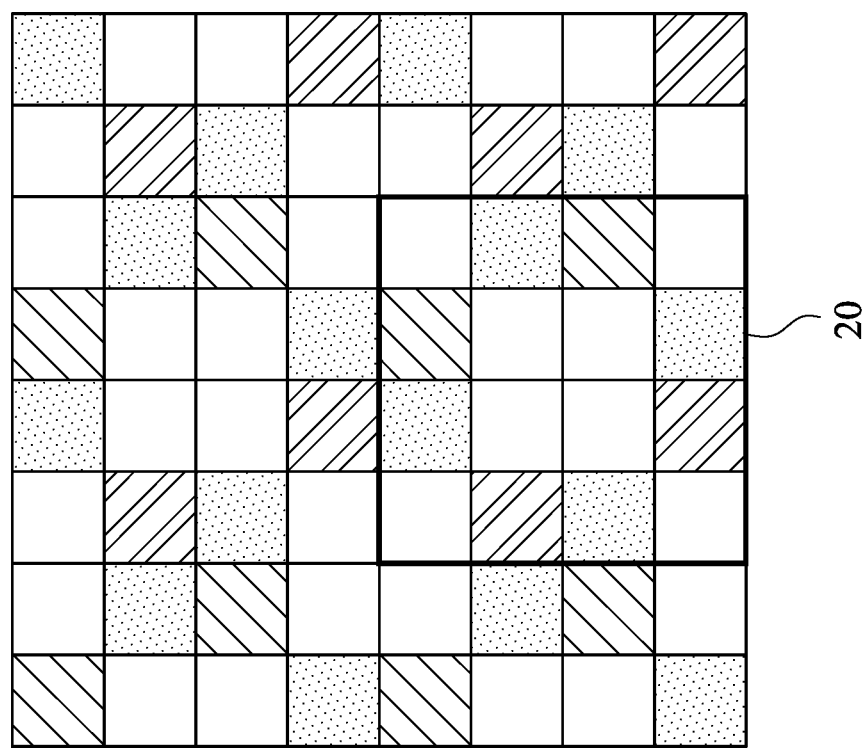
FIG. 5 is a schematic diagram of another minimal repeating unit of the color filter array in accordance with some embodiments of the present disclosure.

It can be appreciated that the minimal repeating unit of the color filter array 100 is not limited to the structure as illustrated in FIG. 2. For example, referring to FIG. 5, FIG. 5 is a schematic diagram of a minimal repeating unit 20 of the color filter array 100 in accordance with some embodiments of the present disclosure.

Figure 6:
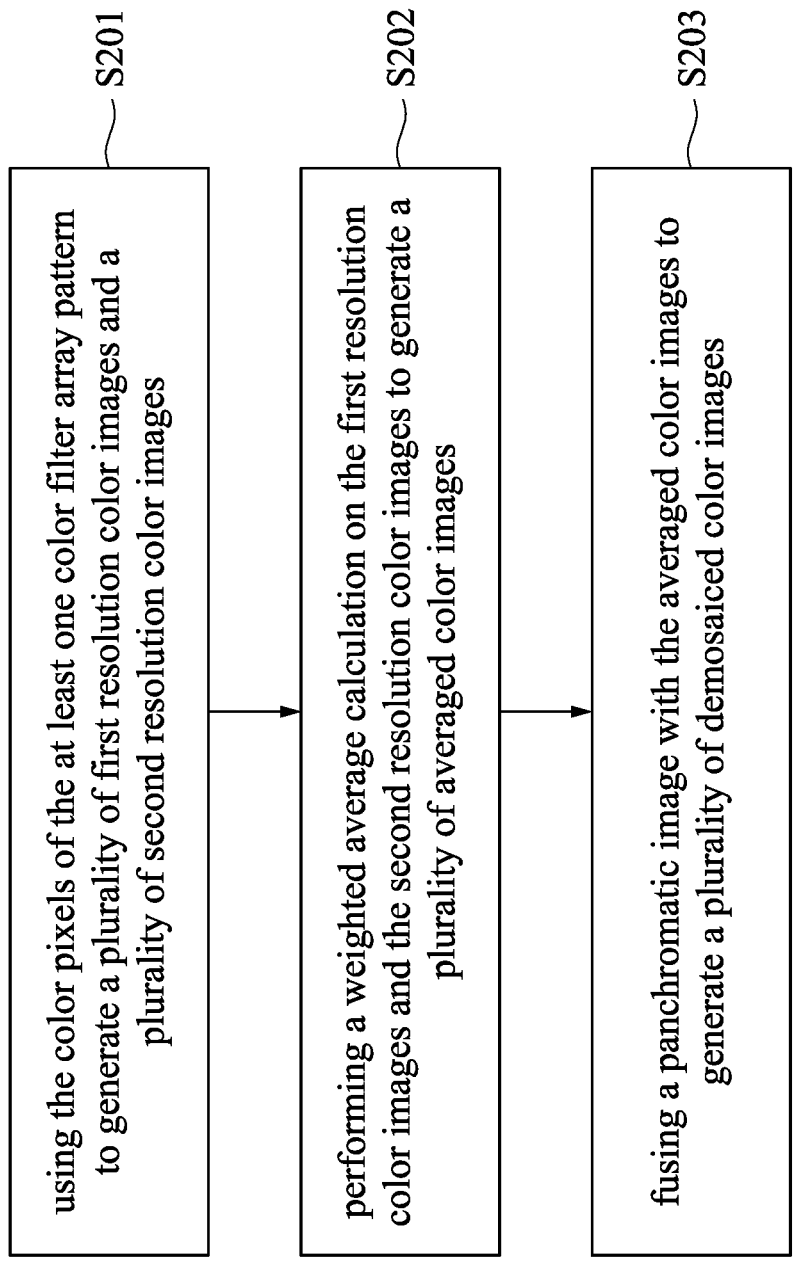
FIG. 6 is a flow diagram of a demosaicing method in accordance with some embodiments of the present disclosure.

Referring to FIG. 6, FIG. 6 is a flow diagram of a demosaicing method 200 in accordance with some embodiments of the present disclosure. In some embodiments, the demosaicing method 200 can be executed by a processing circuit (not shown) to process the mosaicked image, in which the processing circuit is electrically coupled to the image sensor with the color filter array 100 to receive the mosaicked image, but the present disclosure is not limited herein. In some embodiments, as shown in FIG. 6, the demosaicing method 200 includes steps S201-S203. The demosaicing method 200 would be described in detail below with reference to FIG. 7.

Figure 7:
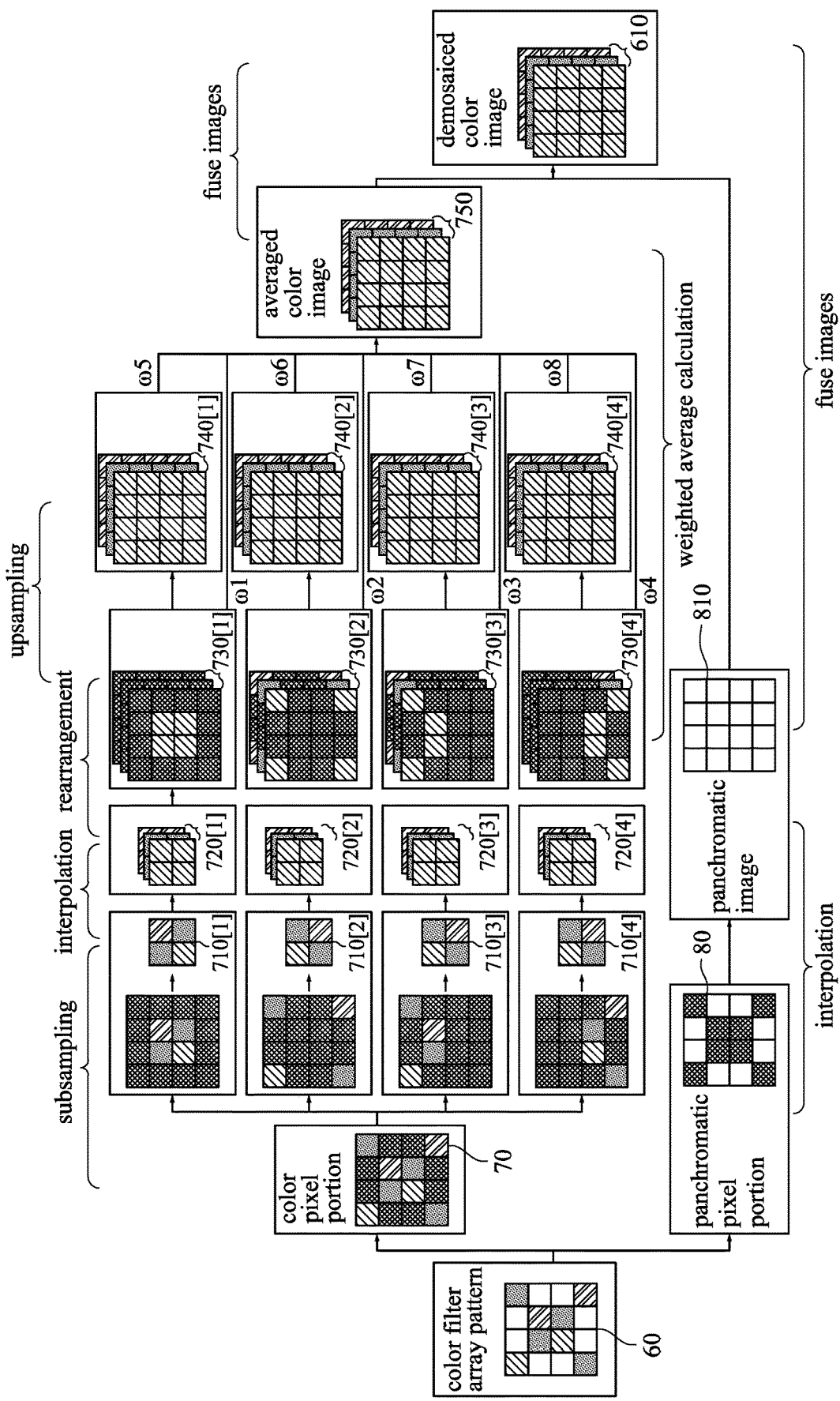
FIG. 7 is a schematic diagram of a demosaicing process for an image with a color filter array (CFA) pattern in accordance with some embodiments of the present disclosure.

Referring to FIG. 7, FIG. 7 is a schematic diagram of the demosaicing process for the mosaicked image in accordance with some embodiments of the present disclosure. In some embodiments, as shown in FIG. 7, the mosaicked image captured via the color filter array 100 includes at least one color filter array (CFA) pattern 60. It can be appreciated that the CFA pattern 60 can be repeatedly appeared in the mosaicked image. The CFA pattern 60 would be described in detail below with reference to FIG. 8.

Figure 8:
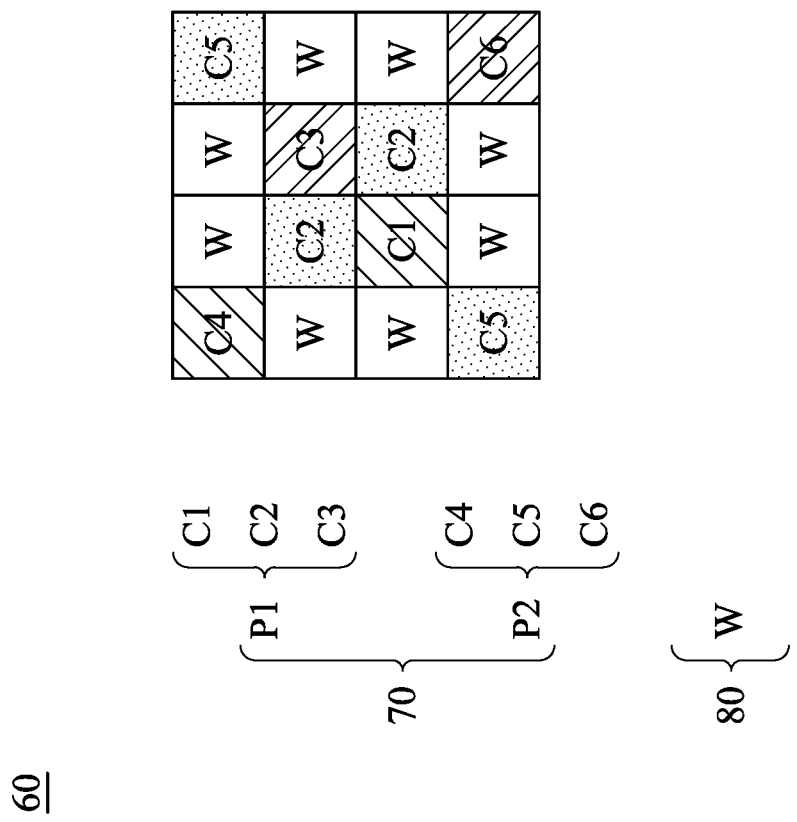
FIG. 8 is a schematic diagram of the CFA pattern of the image in accordance with some embodiments of the present disclosure.

Referring to FIG. 8, FIG. 8 is a schematic diagram of the CFA pattern 60 of the mosaicked image in accordance with some embodiments of the present disclosure. In some embodiments, the CFA pattern 60 includes a color pixel portion 70 and a panchromatic pixel portion 80. The color pixel portion 70 includes a first color pixel set P1 and a second color pixel set P2. The first color pixel set P1 includes a first color pixel C1, two second color pixels C2 and a third color pixel C3. The second color pixel set P2 includes a fourth color pixel C4, two fifth color pixels C5 and a sixth color pixel C6. The panchromatic pixel portion 80 includes a plurality of panchromatic pixels W.

Furthermore, the first color pixel C1 and the fourth color pixel C4 each can have a red pixel value, the second color pixel C2 and the fifth color pixel C5 each can have a green pixel value, and the third color pixel C3 and the sixth color pixel C6 each can have a blue pixel value. The panchromatic pixel W can have a pixel value of panchromatic data.

As shown in FIG. 8, the first color pixel C1, the two second color pixels C2 and the third color pixel C3 of the first color pixel set P1 are arranged in array of 2 rows by 2 columns. The second color pixel set P2 and the panchromatic pixels W are arranged to form a quadrilateral annulus, so as to surround the first color pixel set P1. In other words, the first color pixel set P1 is positioned in an interior of the quadrilateral annulus. It can be seen from above descriptions that at least one array of 2 rows by 2 columns in the CFA pattern 60 is arranged without the panchromatic pixel W.

In step S201, the color pixels of the CFA pattern 60 are used to generate a plurality of first resolution color images 730 and a plurality of second resolution color images 740. As shown in FIG. 7, the first resolution color images 730 and the second resolution color images 740 are generated by using the color pixel portion 70 of the CFA pattern 60, which would be described in detail below.

At first, as shown in FIG. 7, the color pixel portion 70 of the CFA pattern 60 is subsampled to generate a plurality of subsampling images 710. In some embodiments, referring to FIGS. 7 and 8 together, the first color pixel C1, the two second color pixels C2 and the third color pixel C3 of the first color pixel set P1 are taken out of the CFA pattern 60 to form the subsampling image 710[1]. The subsampling process of the color pixel portion 70 would be further described below with reference to FIGS. 9A-9C. FIGS. 9A-9C are schematic diagrams of the subsampling process of the color pixel portion 70 in accordance with some embodiments of the present disclosure.

In some embodiments, as shown in FIG. 9A, the fourth color pixel C4, the two fifth color pixels C5 and the sixth color pixel C6 of the second color pixel set P2 are taken out of the CFA pattern 60 and are arranged in array of 2 rows by 2 columns without changing its relative position relationship in the CFA pattern 60, so as to form the subsampling image 710[2]. It can be seen from FIG. 9A that, either in the color pixel portion 70 of the CFA pattern 60 or in the subsampling image 710[2], the fourth color pixel C4 is to the left of the fifth color pixel C5 at the upper right corner and is above the fifth color pixel C5 at the lower left corner, and the sixth color pixel C6 is below the fifth color pixel C5 at the upper right corner and is to the right of the fifth color pixel C5 at the lower left corner. In other words, the fourth color pixel C4, the two fifth color pixels C5 and the sixth color pixel C6 are arranged according to its relative position relationship in the CFA pattern 60 to generate the subsampling image 710[2].

In some embodiments, as shown in FIG. 9B, the fourth color pixel C4, the fifth color pixel C5, the second color pixel C2 and the third color pixel C3 in an upper region D1 of the CFA pattern 60 are taken out of the CFA pattern 60 and are arranged in array of 2 rows by 2 columns without changing its relative position relationship in the CFA pattern 60, so as to form the subsampling image 710[3]. It can be seen from FIG. 9B that, either in the color pixel portion 70 of the CFA pattern 60 or in subsampling image 710[3], the fourth color pixel C4 is to the left of the fifth color pixel C5 and is above the second color pixel C2, and the third color pixel C3 is below the fifth color pixel C5 and is to the right of the second color pixel C2. In other words, the fourth color pixel C4, the fifth color pixel C5, the second color pixel C2 and the third color pixel C3 in the upper region D1 are arranged according to its relative position relationship (especially its relative position relationship in the vertical direction) in the CFA pattern 60 to generate the subsampling image 710[3].

In some embodiments, as shown in FIG. 9C, the first color pixel C1, the second color pixel C2, the fifth color pixel C5 and the sixth color pixel C6 in a lower region D2 of the CFA pattern 60 are taken out of the CFA pattern 60 and are arranged in array of 2 rows by 2 columns without changing its relative position relationship in the CFA pattern 60, so as to form the subsampling image 710[4]. It can be seen from FIG. 9C that, either in the color pixel portion 70 of the CFA pattern 60 or in subsampling image 710[4], the first color pixel C1 is to the left of the second color pixel C2 and is above the fifth color pixel C5, and the sixth color pixel C6 is below the second color pixel C2 and is to the right of the fifth color pixel C5. In other words, the first color pixel C1, the second color pixel C2, the fifth color pixel C5 and the sixth color pixel C6 in the lower region D2 are arranged according to its relative position relationship (especially its relative position relationship in the vertical direction) in the CFA pattern 60 to generate the subsampling image 710[4].

In some embodiments, as shown in FIG. 7, the subsampling images 710 each is a Bayer pattern. In addition, it can be appreciated that the resolution of each of the subsampling images 710 (which contains 4 pixels) is lower than the resolution of the CFA pattern 60 (which contains 16 pixels).

In some embodiments, after the subsampling images 710 are generated, an interpolation is performed on the subsampling images 710 to generate a plurality of color images 720. For example, as shown in FIG. 7, the subsampling image 710[1] is interpolated to generate three color images 720[1], in which the three color images 720[1] are corresponding to red, green and blue color respectively. The interpolation for the subsampling images 710[2]-710[4] are similar to those of the subsampling image 710[1], and therefore are omitted. The interpolation for generating the color images 720 are well known to the person skilled in the art of the present disclosure, and therefore are not described in detail herein.

Afterward, the color images 720 are rearranged to generate the first resolution color images 730. In some embodiments, the color images 720 each is rearranged according to an arrangement of part of the color pixels of the CFA pattern 60 correspondingly. The three color images 720[2] would be taken as an example for describing the rearrangement process. As shown in FIG. 7, four pixels of each of the three color images 720[2] are rearranged according to the arrangement of the fourth color pixel C4, the two fifth color pixels C5 and the sixth color pixel C6 in the CFA pattern 60 to generate the three first resolution color images 730[2]. In particular, like the fourth color pixel C4, the two fifth color pixels C5 and the sixth color pixel C6 in the CFA pattern 60, the four pixels of each of the color images 720[2] are placed into the upper left corner, the upper right corner, the lower left corner and the lower right corner of a 4×4 pixel array of each of the first resolution color images 730[2] respectively. It can be seen from FIGS. 7 and 8 that the color image 720[2] is rearranged according to the arrangement of the fourth color pixel C4, the two fifth color pixels C5 and the sixth color pixel C6 because the color image 720[2] is generated based on the fourth color pixel C4, the two fifth color pixels C5 and the sixth color pixel C6. Accordingly, the generation of other first resolution color images 730[1], 730[3] and 730[4] can be deduced by analogy, and therefore are omitted herein.

Furthermore, in some embodiments, when pixels of one of the subsampling images 710 have a predetermined arrangement in the CFA pattern 60, pixels of corresponding one of the first resolution color images 730 would have the same predetermined arrangement. The subsampling image 710[2] and the first resolution color images 730[2] would be taken as an example for description. As shown in FIGS. 7 and 9A, the fourth color pixel C4, the fifth color pixels C5 and the sixth color pixel C6 of the subsampling image 710[2] are arranged at the upper left corner, the upper right corner, the lower left corner and the lower right corner of the CFA pattern 60 before the subsampling process, and pixels of each of the first resolution color images 730[2] are also arranged at the upper left corner, the upper right corner, the lower left corner and the lower right corner of the 4×4 pixel array of each of the first resolution color images 730[2].

In some embodiment, as shown in FIG. 7, an upsampling process is performed on the first resolution color images 730 to generate the second resolution color images 740. The three first resolution color images 730[1] would be taken as an example for describing the upsampling process. As shown in FIG. 7, the 4×4 pixel array of each of the three first resolution color images 730[1] has a capacity of 16 pixels, but currently contains 4 pixels only. That is, there are 12 available empties (which are filled with cross grid in FIG. 7) in the 4×4 pixel array of each of the three first resolution color images 730[1]. The upsampling process is configured to fill the 12 available empties in the 4×4 pixel array of each of the three first resolution color images 730[1] to generate the three second resolution color image 740[1]. The generation of other second resolution color images 740[2], 740[3] and 740[4] can be deduced by analogy, and therefore are omitted herein. The upsampling process is well known to the person skilled in the art of the present disclosure, and therefore is not described in detail herein. It can be seen from above descriptions that the resolution of each of the second resolution color images 740 (which contains 16 pixels) is same as the resolution of the CFA pattern 60 (which contains 16 pixels) and is higher than the resolution of each of the first resolution color images 730 (which contains 4 pixels).

Referring to FIGS. 6 and 7 together, in step S202, a weighted average calculation is performed on the first resolution color images 730 and the second resolution color images 740 to generate a plurality of averaged color images 750. In some embodiments, as shown in FIG. 7, a plurality of weighting value $\omega_1$-$\omega_8$ are applied to the first resolution color images 730 and the second resolution color images 740 to generate the averaged color images 750. The first resolution color images 730[1] are taken as an example for description. In particular, the luminance and the chromaticity of the first resolution color images 730[1] are multiplied by the weighting value $\omega_1$. The calculation of the first resolution color images 730[2], 730[3] and 730[4] and the second resolution color images 740[1], 740[2], 740[3] and 740[4] can be deduced by analogy. Then, the first resolution color images 730[1], 730[2], 730[3] and 730[4] and the second resolution color images 740[1], 740[2], 740[3] and 740[4] which are corresponding to one of three colors (i.e., red, green or blue color) are averaged to generate one of the averaged color images 750 having the same color.

It can be appreciated that the weighting value $\omega_1$-$\omega_8$ can be all same or all different, or can be part same, part different. In some embodiment, the distribution of the pixels of the first resolution color images 730[1] and 730[2] is more uniform than the distribution of the pixels of the first resolution color images 730[3] and 730[4]. Accordingly, the weighting values $\omega_1$ and $\omega_2$ each is greater than the weighting values $\omega_3$ and $\omega_4$.

In the embodiments of FIG. 7, each image is applied with one weighting value, but the present disclosure is not limited thereto. For example, in some embodiments, each pixel of each first resolution color image 730 and each pixel of each second resolution color image 740 are applied with one weighting value.

In some embodiments, as shown in FIG. 7, an interpolation is performed on the panchromatic pixel portion 80 of the CFA pattern 60 to generate a panchromatic image 810. As shown in FIG. 8, the panchromatic pixel portion 80 contains 8 pixels. The panchromatic pixel portion 80 is interpolated (or inpainted) to generate the panchromatic image 810 having 16 pixels.

Referring to FIGS. 6 and 7 together again, in step S203, the panchromatic image 810 is fused with the averaged color images 750 to generate a plurality of demosaiced color images 610. In some embodiment, the luminance of each of the averaged color images 750 is replaced with the luminance of the panchromatic image 810 to generate the demosaiced color images 610. It can be seen from FIG. 7 that the resolution of the panchromatic image 810 (which contains 16 pixels) and the resolution of each of the averaged color images 750 (which contains 16 pixels) are same as the resolution of the CFA pattern 60 (which contains 16 pixels).

Notably, by using the demosaicing method 200 to process the mosaicked image, the obtained image of the present disclosure has better color accuracy. For example, color accuracy of the obtained image of the present disclosure is increased by 48.7%-55.8% in comparison to the known demosaicing method. In addition, by using the color filter array 100 of the present disclosure, the obtained image of the present disclosure has PSNR (Peak Signal to Noise Ratio) comparable to those of the known color filter array. In sum, the color filter array 100 and the demosaicing method 200 of the present disclosure has the advantage of obtaining images with high sensitivity and improved color accuracy.

The disclosed methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the at least one processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A color filter array, comprising:
   at least one minimal repeating unit, wherein the at least one minimal repeating unit comprises:
      a first filter set comprising a first color filter having a first spectrum, two second color filters having a second spectrum and a third color filter having a third spectrum; and
      a second filter set comprising a fourth color filter having the first spectrum, two fifth color filters having the second spectrum, a sixth color filter having the third spectrum and a plurality of broadband filters each having a fourth spectrum broader than any of the first spectrum, the second spectrum and the third spectrum;
   wherein the second filter set is arranged to form a quadrilateral annulus, with four corners of the quadrilateral annulus defined by only filters belonging to the fourth color filter, the fifth color filters and the sixth color filter, and the first filter set is positioned in an interior of the quadrilateral annulus.

2. The color filter array of claim 1, wherein the first color filter, the second color filters and the third color filter are arranged in an array of 2 rows by 2 columns.

3. The color filter array of claim 1, wherein the first color filter, the second color filters and the third color filter are arranged in a Bayer arrangement.

4. The color filter array of claim 1, wherein when the at least one minimal repeating unit are divided into four cells which are arranged in a square array and two of the cells in a left side region of the at least one minimal repeating unit are arranged along a horizontal direction, the two of the cells in the left side region are symmetrical to each other.

5. The color filter array of claim 1, wherein when the at least one minimal repeating unit are divided into four cells which are arranged in a square array and two of the cells in a right side region of the at least one minimal repeating unit are arranged along a horizontal direction, the two of the cells in the right side region are symmetrical to each other.

6. The color filter array of claim 1, wherein each side of the first filter set is adjacent to two of the broadband filters.

7. The color filter array of claim 1, wherein the first color filter (a1), the second color filters (b1), the third color filter (c1), the fourth color filter (a2), the fifth color filters (b2), the sixth color filter (c2) and the broadband filters (p) have the following arrangement:
   a2 p p b2,
   p b1 c1 p,
   p a1 b1 p,
   b2 p p c2.

8. A demosaicing method for an image captured via a color filter array, wherein the image comprises at least one color filter array (CFA) pattern, and the demosaicing method comprises:
   using a plurality of color pixels of the at least one CFA pattern to generate a plurality of first resolution color images and a plurality of second resolution color images, wherein a resolution of each of the second resolution color images is same as a resolution of the at least one CFA pattern and is higher than a resolution of each of the first resolution color images;
   performing a weighted average calculation on the first resolution color images and the second resolution color images to generate a plurality of averaged color images; and
   fusing a panchromatic image with the averaged color images to generate a plurality of demosaiced color images, wherein a resolution of the panchromatic image and a resolution of each of the averaged color images are same as the resolution of the at least one CFA pattern.

9. The demosaicing method of claim 8, wherein the operation of performing the weighted average calculation on the first resolution color images and the second resolution color images comprises:
   applying a weighting value to each of the first resolution color images and each of the second resolution color images correspondingly.

10. The demosaicing method of claim 8, wherein when a distribution of pixels of one of the first resolution color images is more uniform than a distribution of pixels of another one of the first resolution color images, the operation of performing the weighted average calculation on the first resolution color images and the second resolution color images comprises:
    applying a first weighting value to the one of the first resolution color images; and
    applying a second weighting value to the another one of the first resolution color images, wherein the first weighting value is greater than the second weighting value.

11. The demosaicing method of claim 8, wherein the operation of performing the weighted average calculation on the first resolution color images and the second resolution color images comprises:
    applying a weighting value to each pixel of each of the first resolution color images and each pixel of each of the second resolution color images correspondingly.

12. The demosaicing method of claim 8, further comprising:
    performing an interpolation on a plurality of panchromatic pixels of the at least one CFA pattern to generate the panchromatic image.

13. The demosaicing method of claim 8, further comprising:
    subsampling the color pixels of the at least one CFA pattern to generate a plurality of subsampling images, wherein the subsampling images each is a Bayer pattern, and a resolution of each of the subsampling images is lower than the resolution of the at least one CFA pattern.

14. The demosaicing method of claim 13, wherein the color pixels comprise a first color pixel set and a second color pixel set, the first color pixel set comprises a first color pixel, two second color pixels and a third color pixel, the second color pixel set comprises a fourth color pixel, two fifth color pixels and a sixth color pixel, and the second color pixel set and a plurality of panchromatic pixels of the at least one CFA pattern are arranged to form a quadrilateral annulus, and the first color pixel set is positioned in an interior of the quadrilateral annulus;

wherein the fourth color pixel, the fifth color pixels and the sixth color pixel have a relative position relationship in the at least one CFA pattern;

wherein the operation of subsampling the color pixels of the at least one CFA pattern to generate the subsampling images comprises:

arranging the fourth color pixel, the fifth color pixels and the sixth color pixel in an array of 2 rows by 2 columns according to the relative position relationship to form one of the subsampling images.

15. The demosaicing method of claim 13, wherein the color pixels comprise a first color pixel set and a second color pixel set, the first color pixel set comprises a first color pixel, two second color pixels and a third color pixel, the second color pixel set comprises a fourth color pixel, two fifth color pixels and a sixth color pixel, and the second color pixel set and a plurality of panchromatic pixels of the at least one CFA pattern are arranged to form a quadrilateral annulus, and the first color pixel set is positioned in an interior of the quadrilateral annulus;

wherein one of the second color pixels, the third color pixel, the fourth color pixel and one of the fifth color pixels in an upper region of the at least one CFA pattern have a relative position relationship in a vertical direction;

wherein the operation of subsampling the color pixels of the at least one CFA pattern to generate the subsampling images comprises:

arranging the one of the second color pixels, the third color pixel, the fourth color pixel and the one of the fifth color pixels in an array of 2 rows by 2 columns according to the relative position relationship to form one of the subsampling images.

16. The demosaicing method of claim 13, wherein the color pixels comprise a first color pixel set and a second color pixel set, the first color pixel set comprises a first color pixel, two second color pixels and a third color pixel, the second color pixel set comprises a fourth color pixel, two fifth color pixels and a sixth color pixel, and the second color pixel set and a plurality of panchromatic pixels of the at least one CFA pattern are arranged to form a quadrilateral annulus, and the first color pixel set is positioned in an interior of the quadrilateral annulus;

wherein the first color pixel, one of the second color pixels, one of the fifth color pixels and the sixth color pixel in a lower region of the at least one CFA pattern have a relative position relationship in a vertical direction;

wherein the operation of subsampling the color pixels of the at least one CFA pattern to generate the subsampling images comprises:

arranging the first color pixel, the one of the second color pixels, the one of the fifth color pixels and the sixth color pixel in an array of 2 rows by 2 columns according to the relative position relationship to form one of the subsampling images.

17. The demosaicing method of claim 13, further comprising:

performing an interpolation on the subsampling images to generate a plurality of color images; and rearranging the color images to generate the first resolution color images.

18. The demosaicing method of claim 17, further comprising:

upsampling the first resolution color images to generate the second resolution color images.

19. The demosaicing method of claim 17, wherein when pixels of one of the subsampling images have a predetermined arrangement in the at least one CFA pattern, pixels of one of the first resolution color images have the same predetermined arrangement as the pixels of the one of the subsampling images in the at least one CFA pattern.

20. The demosaicing method of claim 17, wherein the color images each is rearranged according to an arrangement of part of the color pixels of the at least one CFA pattern correspondingly.

* * * * *